United States Patent Office 2,940,961
Patented June 14, 1960

2,940,961

ALKYL 1-ACETOXYALKENYLPHOSPHONATES AND POLYMERS THEREOF

Harry W. Coover, Jr., and Richard L. McConnell, Kingsport, Tenn., assignors to Eastman Kodak Company, Rochester, N.Y., a corporation of New Jersey.

No Drawing. Filed Aug. 9, 1957, Ser. No. 677,232

14 Claims. (Cl. 260—85.5)

This invention relates to alkyl 1-acetoxyalkenyl phosphonates, to polymers thereof, and to methods for preparing these compounds.

We have found that a new series of phosphorus containing compounds that are polymerizable to valuable resinous materials can be prepared by reacting ketene with dialkly phosphites and dialkyl acylphosphonates. The new monomeric compounds of our invention are represented by the following general formulas:

(I) 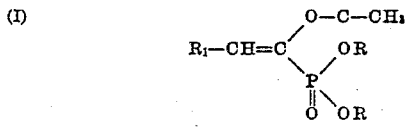

and (II) 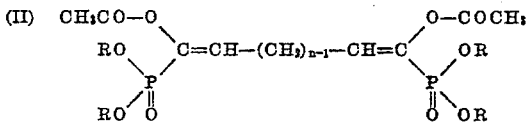

wherein $n$ is an integer of from 1 to 9 and each R represents an alkyl group of from 1 to 12 carbon atoms e.g. methyl, ethyl, propyl, isopropyl, butyl, isobutyl, hexyl, decyl, dodecyl, etc. groups and $R_1$ represents a hydrogen atom or an alkyl group of from 1 to 10 carbon atoms. They are useful for preparing various derivatives thereof, and more especially useful for preparing resinous homopolymers and inter polymers with themselves or with one or more other polymerizable, monoethylenically unsaturated compounds, which polymers exhibit many desirable properties such as high flame-resistance, toughness and good solubility in various common volatile solvents, and from which can be prepared excellent quality fibers for textile purposes and molding compositions giving shaped articles of good stability. The polymers are also capable of being hydrolyzed, re-esterified, acetalized, etc. to give modified polymers.

It is, accordingly, an object of the invention to provide a new class of unsaturated phosphonates containing acetyl groups, and polymers thereof. Another object is to provide shaped articles from the new polymers such as fibers, molded objects, films, sheet materials, etc. Another object is to provide methods for preparing the new monomers and polymers thereof. Other objects will become apparent hereinafter.

In accordance with the invention, we prepare our compounds represented by the above Formula I by reacting 2 moles of ketene with a dialkyl phosphite or with a dialkyl acylphosphonate, in the presence of a catalyst such as boron trifluoride, sulfuric acid, phosphoric acid, zinc chloride, etc., and in the presence, if desired, of an inert solvent such as ether, ethyl acetate, benzene, chlorobenzene, petroleum hydrocarbons and similar ethers, esters, hydrocarbons, chlorinated hydrocarbons, etc., at from about 0° to 100° C., as follows:

(III)
(IV)
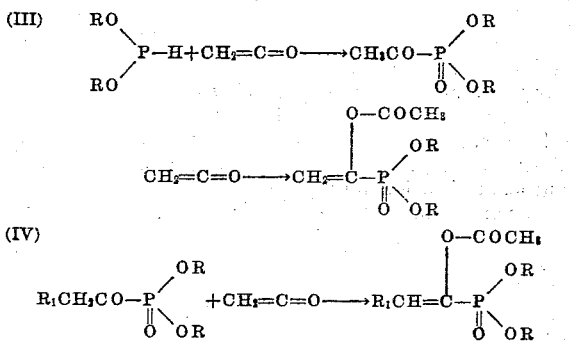

wherein each R and $R_1$ are as previously defined. Typical dialkyl phosphites that can be employed in the above reactions include those members wherein each of the alkyl groups contain from 1 to 12 carbon toms such as dimethyl phosphite, diethyl phosphite, dibutyl phosphite, dihexyl phosphite, didecyl phosphite, didodecyl phosphite, methylethyl phosphite, etc. and typical dialkyl acylphosphonates include those members wherein each alkyl group contains from 1 to 12 carbon atoms and the acyl group is the radical of a saturated fatty acid containing from 1 to 12 carbon atoms such as dimethyl acetylphosphonate, diethyl acetylphosphonate, diethyl propionylphosphonate, diethyl butyrylphosphonate, diethyl lauroylphosphonate, etc.

We prepare the new compounds represented by above Formula II by reacting ketene with $\alpha,\omega$-bis (dialkylphosphonocarbonyl) alkanes, under the conditions as above described, the reaction being represented as follows:

(V)
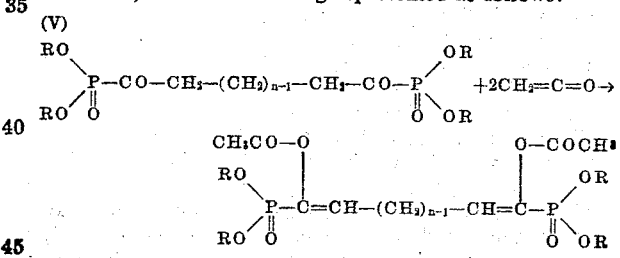

wherein $n$ and R are as previously defined. Typical $\alpha,\omega$-bis (dialkylphosphonylcarbonyl) alkanes that can be employed in the above reaction include those members wherein the alkane group contains from 2 to 10 carbon atoms such as tetramethyl succinoyldiphosphonate, tetraethyl succinoyldiphosphonate, tetraethyl glutaroyldiphosphonate, tetraethyl adipoyldiphosphonate, tetraethyl sebacoyldiphosphonate, tetraethyl dodecanedioyldiphosphonate, tetradecyl adipoyldiphosphonate, etc.

The polymerizations of the new compounds of the invention alone or conjointly with each other or with one or more monoethylenically unsaturated, polymerizable compounds containing a —CH=C< group, and more especially a $CH_2$=C< group, can be carried out in bulk (mass), solution or emulsion processes, and advantageously in the presence of a polymerization catalyst. Heat or actinic light can also be used to accelerate the polymerization reaction. In both bulk and solvent polymerizations, the organic peroxide catalysts are advantageously employed. These include benzoyl, acetyl, lauroyl, di-tert-butyl peroxide, etc. Water-soluble inorganic peroxides can also be used, e.g., hydrogen peroxide, ammonium persulfate, potassium persulfate, sodium persulfate, persulfuric acid, sodium perborate, and water-soluble salts of sulfo-per-acids (e.g. Caro's acid). Other catalysts such as boron trifluoride, azines, ketazines, etc. can also be employed. Mixtures of these catalysts can be used, if desired. The total amount of catalyst can vary from about 0.1 to 1%, based on the weight of the monomers to be polymerized. If desired, activating agents such as an alkali metal bisulfite, e.g. sodium or potassium bisulfite, can be added in about similar amount. Also chain regulators such as alkyl mercaptans, e.g. lauryl mercaptan can be added with advantage to the mixtures. The temperature can vary widely, but preferably from 20° to 125° C. Normal or higher than atmospheric pressures may be employed. Advantageously, the reactions can be carried out under an inert atmosphere, e.g. under nitrogen. Suitable solvent media include water, benzene, toluene, ethanol, acetone, acetonitrile, acetic acid, and the like.

For emulsion polymerizations employing peroxide type catalysts any non-solvent for the monomers can be employed, water being especially advantageous. The monomers can be emulsified in water using emulsifying agents such as salts of higher fatty acids, e.g. sodium or potassium stearate, palmitate, etc., or ordinary soaps, salts of higher fatty alcohol sulfates, e.g. sodium or potassium lauryl sulfate, sodium or potassium di(2-ethylhexyl) sulfosuccinate, sodium or potassium cetyl sulfate, sodium or potassium stearyl sulfate, etc., salts of aromatic sulfonic acids, e.g. sodium or potassium salts of alkylnaphthalene sulfonic acids, and higher molecular weight quaternary ammonium salts, e.g. dimethyl benzylphenyl ammonium chloride. For bead or granular polymerizations relatively poor dispersing agents such as starch, methylated starch, gum arabic, polyvinyl alcohol, partially hydrolyzed polyvinyl acetate, gelatin, sodium glycolate, etc. can be employed. Mixtures of these dispersing agents can also be used. In the above polymerizations in which the monomers are dispersed in a non-solvent, the dispersion and polymerization can be facilitated by stirring, shaking or tumbling the polymerization mixtures.

The new monomeric compounds of the invention can also be effectively homopolymerized or copolymerized in the presence of a metal alkyl catalyst such as metal alkyls of groups 1, 2 and 3 of the periodic table of the elements, e.g. lithium, sodium or potassium alkyls of group 1, magnesium and zinc alkyls of group 2 and aluminum alkyls of group 3, and more specifically lithium butyl, sodium amyl, diethyl zinc, triethylaluminum, aluminum sesquibromide, etc., and alfin type catalysts e.g. a mixture of sodium amyl, sodium chloride, sodium isopropoxide and sodium allyl in pentane. The amount of catalyst can vary from about 0.1 to 5.0%, and even higher, if desired, based on the weight of monomers to be polymerized. The temperature can vary over a wide range of from about −70° to 200° C., but a range of 0° to 100° C. is preferred. Advantageously, the polymerizations with these catalysts are carried out under anhydrous conditions in a dry organic solvent media, preferably a hydrocarbon liquid such as pentane, heptane, etc., and under an atmosphere of nitrogen.

The copolymers of the invention prepared by the above described polymerization procedures can contain any proportions of one or more of the monomeric compounds of the invention with any proportions of one or more other monoethylenically unsaturated, polymerizable compounds, but preferably in the proportions of from 5 to 95 parts by weight of the former to from 95 to 5 parts by weight of the latter compounds. Suitable monoethylenically unsaturated polymerizable compounds containing a —CH=C< group, or more especially a CH$_2$=C< group include vinyl carboxylic acid esters such as vinyl acetate, vinyl propionate, vinyl benzoate, vinyl trifluoroacetate, etc., alkyl esters of acrylic and methacrylic acids such as methyl acrylate, ethyl acrylate, butyl acrylate, methyl methacrylate, etc., unsaturated nitriles such as acrylonitrile, methacrylonitrile ethacrylonitrile, etc., vinyl hydrocarbons such as styrene, α-methylstyrene, isobutylene, ethylene, etc., vinyl chloride, vinylidene chloride, vinylidene cyanide, vinyl fluoride, isopropenyl acetate, allyl acetate, methallyl acetate, vinyl ethers, vinyl sulfonamides, vinyl urethanes, vinyl pyrrolidones, vinyl pyridines, and the like. The copolymers obtained have been found to contain approximately the same proportion of constituents as were present in the starting polymerization mixtures.

The following examples will serve further to illustrate the novel monomers of the invention, polymers thereof, and the manner of preparing the same.

*Example 1*

Method A.—36 g. (0.2 mol.) of diethyl acetylphosphonate and 1 drop of boron trifluoride etherate were placed in a flask and stirred while ketene was bubbled in through a fritted disc. The reaction flask was cooled in an ice water bath while the ketene was being added. After 9.3 g. (0.22 mol.) of ketene had been absorbed, the ketene source was removed and the reaction mixture stirred at 25° C. for four hours. The reaction mixture was stripped at reduced pressure (1–2 mm.) to remove volatile impurities. The crude product was a transparent red oil, having a refractive index of 1.4361 at 20° C. Distillation of this crude product in vacuo gave a water white liquid, B.P. 79–80° C. (0.3 mm.) $n_D^{20}$ 1.4378, identified as the compound, diethyl 1-acetoxyvinylphosphonate, and having the structural formula:

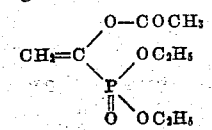

Method B.—Diethyl 1-acetoxyvinylphosphonate was also prepared by starting with the intermediate, diethyl hydrogen phosphite, in the following manner:

27.6 g. (0.2 mol.) of diethyl hydrogen phosphite and 1 drop of boron trifluoride etherate were placed in a flask and stirred while ketene was bubbled in through a fritted disc. Again the reaction flask was cooled in ice water. When 17.6 g. (0.42 mol.) of ketene had been absorbed, the ketene source was removed. The reaction mixture was stirred at 25° C. for 4 hours to allow the excess ketene to evaporate. Finally the reaction mixture was stripped at 25° C. under reduced pressure (1–2 mm.) to remove volatile impurities. Again the crude product was a transparent red oil having a refractive index of 1.4358 at 20° C. Distillation in vacuo produced a water white liquid, B.P. 97–99° C. (2.0 mm.) $n_D^{20}$ 1.4370. The infrared spectrum of this sample of diethyl 1-acetoxyvinylphosphonate was identical with that of the sample obtained by Method A above.

The reaction of diethyl hydrogen phosphite with ketene using boron trifluoride was repeated using toluene as a solvent. In this case, the temperature of the reaction was maintained in the 30–80° C. range. Distillation of this reaction mixture in vacuo again resulted in isolation of diethyl 1-acetoxyvinylphosphonate.

In place of diethyl acetylphosphonate or diethyl hydrogen phosphite, there may be substituted in the above methods an equivalent amount of the corresponding di-n-propyl and di-n-butyl esters to give generally similar products.

*Example 2*

38.6 g. (0.1 mole) of didodecyl hydrogen phosphite were reacted with 8.4 g. (0.2 mole) of ketene according to Method B of Example 1 using BF$_3$-etherate as the catalyst. The product obtained as a viscous oil was didodecyl 1-acetoxyvinylphosphonate having the following structural formula:

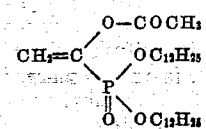

Example 3

38.8 g. (0.2 mol.) of dibutyl hydrogen phosphite were reacted with ketene according to the procedure of Method B of Example 1, except that sulfuric acid was employed as the catalyst in place of the boron trifluoride etherate. The product obtained, dibutyl 1-acetoxyvinylphosphonate, has the structure:

$$CH_2=C\begin{array}{c}O-COCH_3\\OC_4H_9\\P\\\parallel\phantom{O}\backslash OC_4H_9\\O\end{array}$$

The distilled product was a transparent liquid, B.P. 114–116° C. (0.5 mm.).

Example 4

41.6 g. (0.2 mol.) of diethyl isobutyrylphosphonate were reacted with ketene according to the procedure of Method A of Example 1 except that 2 drops of phosphoric acid were added as catalyst in place of the boron trifluoride etherate. The product obtained, diethyl 1-acetoxy-2-methylpropenylphosphonate, has the structure:

$$(CH_3)_2C=C\begin{array}{c}O-COCH_3\\OC_2H_5\\P\\\parallel\phantom{O}\backslash OC_2H_5\\O\end{array}$$

The distilled product was a transparent liquid, B.P. 95–98° C. (0.4 mm.).

Example 5

61.2 g. (0.2 mol.) of bis-(2-ethylhexyl)hydrogen phosphite were reacted with ketene according to the procedure of Method B of Example 1. The product obtained, bis-(2-ethylhexyl) 1-acetoxyvinylphosphonate, has the structure:

$$CH_2=C\begin{array}{c}O-COCH_3\\OCH_2CH_4H_9\\|\\C_2H_5\\P\\\parallel\phantom{O}\backslash OCH_2CHC_4H_9\\O\phantom{XXXXX}|\\\phantom{XXXXXXX}C_2H_5\end{array}$$

The product was a transparent oil.

Example 6

64 g. (0.2 mol.) of diethyl lauroylphosphonate were reacted with ketene (0.2 mol.) according to the procedure of Method A of Example 1 using 4 drops of boron trifluoride etherate as the catalyst. The product obtained, diethyl 1-acetoxydodecenylphosphonate, has the structure:

$$CH_3(CH_2)_9CH=C\begin{array}{c}O-COCH_3\\OC_2H_5\\P\\\parallel\phantom{O}\backslash OC_2H_5\\O\end{array}$$

The product was a transparent oil.

Example 7

38.6 g. (0.1 mol.) of tetraethyl adipoyldiphosphonate were reacted with ketene (0.2 mol.) according to the procedure of Method A of Example 1 using 10 drops of boron trifluoride etherate as the catalyst. The product obtained, tetraethyl 1,6-diacetoxy-1,5-hexadienyldiphosphonate, has the structure:

$$\begin{array}{cc}CH_3CO-O & O-COCH_3\\C_2H_5O\phantom{XX}| & |\phantom{XX}OC_2H_5\\\phantom{XXX}\backslash P-C=CHCH_2CH_2CH=C-P/\\C_2H_5O/\phantom{X}\parallel & \parallel\phantom{X}\backslash OC_2H_5\\\phantom{XXXX}O & O\end{array}$$

The product was a viscous transparent oil.

Example 8

20 g. of diethyl 1-acetoxyvinylphosphonate and 25 cc. of dry hexane were mixed and stirred while 1.0 g. triethylaluminum dissolved in 3 cc. of dry heptane was added dropwise. The reaction vessel was kept under a blanket of nitrogen during the entire time of reaction. The polymerization was exothermic and the reaction mixture became viscous. After a short time, the reaction mixture separated into two layers. Then it was heated to reflux for 3 hours. The precipitated polymer was separated and dried at 80° C. to remove any remaining solvent. It was identified as the homopolymer of diethyl 1-acetoxyvinylphosphonate and was a tough rubbery mass readily soluble in acetone. Transparent films were prepared by coating the acetone solutions or dopes thereof onto a glass plate and stripping the films therefrom. The polymeric product also gave tough rubbery buttons when compression molded at 360° F. and 10,000 p.s.i.

Example 9

Dibutyl 1-acetoxyvinylphosphonate was homopolymerized according to the procedure of Example 7 employing dry benzene as the solvent and triethylaluminum sesquibromide as the catalyst. The homopolymer obtained was soluble in acetone and coatings therefrom gave transparent tough films. The homopolymer was also useful for preparing molded articles such as buttons, combs, etc.

Example 10

A mixture of 4.0 g. of diethyl 1-acetoxyvinylphosphonate, 10.0 g. of methyl methacrylate and 0.2 g. of benzoyl peroxide was heated at 80° to 85° C. for a period of 24 hours. A clear hard moldable copolymer of approximately 28% by weight of the above phosphonate and approximately 72% by weight of methyl methacrylate was obtained. It was soluble in acetone.

Example 11

2.0 g. of dibutyl 1-acetoxyvinylphosphonate, 10.0 g. of acrylonitrile, 0.2 g. of ammonium persulfate, 0.2 g. of sodium bisulfite and 2.0 g. of potassium laurate were added to 100 cc. of distilled water. Polymerization began immediately and was complete within 8 hours. The reaction mixture was tumbled during the polymerization. The copolymer precipitated from solution and was isolated by filtration. After washing and drying, the product was a white powder readily soluble in dimethyl formamide and dimethyl acetamide from which solutions it was spinnable to flame resistant fibers. It contained approximately 10% by weight of the above phosphonate and approximately 90% by weight of acrylonitrile.

Example 12

2.0 g. of diethyl 1-acetoxyvinylphosphate, 8.0 g. of vinyl chloride, 0.2 g. of ammonium persulfate, 0.2 g. of sodium bisulfite and 2.0 g. of potassium laurate were added to 100 cc. of distilled water. The mixture was stirred into an emulsion and polymerized by heating it at 35° to 45° C. for a period of 16 hours. The copolymer which formed was precipitated by adding a saturated aqueous solution of sodium chloride to the polymerization mixture. The copolymer was filtered off, washed with water and dried. It consisted of approximately 20% by weight of the above phosphonate and approximately 80% by weight of vinyl chloride, and was soluble in methyl ethyl ketone and cyclohexanone. Films coated from solutions of the copolymers were tough and flame resistant.

Example 13

A mixture of 1.0 g. of bis(2-ethylhexyl) 1-acetoxyvinylphosphonate, 10.0 g. of styrene and 0.2 g. of benzoyl peroxide was heated at 80° C. for 16 hours. A clear, moldable copolymer containing approximately 9% by weight of the above phosphonate and approximately 91% by weight of styrene was obtained. It was soluble in methylene chloride and acetone.

*Example 14*

A mixture of 5.0 g. of diethyl 1-acetoxyvinylphosphonate, 10.0 g. of vinyl acetate and 0.3 g. of acetyl peroxide was heated in a sealed tube at 100° C. for 36 hours. A clear, hard and moldable copolymer containing approximately 33% by weight of the above phosphonate and approximately 67% by weight of vinyl acetate was obtained. It was soluble in acetone and in acetonitrile.

By following the procedures in the above examples, other species of monomers and polymers coming within the defined limits of the invention can be prepared. All of these polymers can be dissolved in one or more of the mentioned organic solvents to form solutions or dopes which can be extruded to filaments, coated to continuous sheets or applied as impregnating agents to paper and textiles and other fibrous materials. They are also readily moldable, with or without plasticizers, fillers, coloring matter, etc., by means of extrusion, injection or compression methods into shaped articles which are tough and flame resistant.

We claim:

1. An alkyl 1-acetoxyalkenyl phosphonate selected from the group consisting of compounds having the general formula:

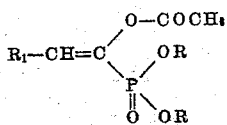

and

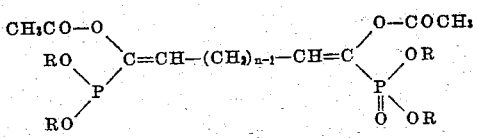

wherein $n$ is an integer of from 1 to 9, each R represents an alkyl group of from 1 to 12 carbon atoms, and $R_1$ represents a member selected from the group consisting of a hydrogen atom and an alkyl group of from 1 to 10 carbon atoms.

2. An alkyl 1-acetoxyalkenyl phosphonate having the general formula:

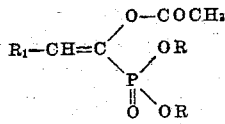

wherein each R represents an alkyl group of from 1 to 12 carbon atoms and $R_1$ represents a member selected from the group consisting of a hydrogen atom and an alkyl group of from 1 to 10 carbon atoms.

3. Diethyl 1-acetoxyvinylphosphonate.
4. Dibutyl 1-acetoxyvinylphosphonate.
5. Bis-(2-ethylhexyl) 1-acetoxyvinylphosphonate.
6. Diethyl 1-acetoxy-2-methylpropenylphosphonate.
7. Diethyl 1-acetoxydodecenylphosphonate.
8. A polymer of an alkyl 1-acetoxyalkenyl phosphonate selected from the group consisting of compounds having the general formula:

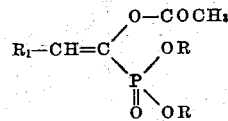

and

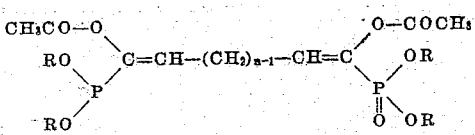

wherein $n$ is an integer of from 1 to 9, each R represents an alkyl group of from 1 to 12 carbon atoms, and $R_1$ represents a member selected from the group consisting of a hydrogen atom and an alkyl group of from 1 to 10 carbon atoms.

9. A polymer of an alkyl 1-acetoxyalkenyl phosphonate having the general formula:

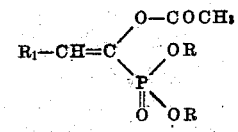

wherein each R represents an alkyl group of from 1 to 12 carbon atoms and $R_1$ represents a member selected from the group consisting of a hydrogen atom and an alkyl group of from 1 to 10 carbon atoms.

10. A copolymer of diethyl 1-acetoxyvinylphosphonate and methyl methacrylate.
11. A copolymer of diethyl 1-acetoxyvinylphosphonate and vinyl chloride.
12. A copolymer of diethyl 1-acetoxyvinylphosphonate and vinyl acetate.
13. A copolymer of dibutyl 1-acetoxyvinylphosphonate and acrylonitrile.
14. A copolymer of bis(2-ethylhexyl) 1-acetoxyvinylphosphonate and styrene.

References Cited in the file of this patent

UNITED STATES PATENTS 2,559,854    Dickey et al. _____ July 10, 1951